Feb. 3, 1953     G. P. PIRWITZ     2,627,214
PHOTOGRAPHIC SHUTTER WITH SYNCHRONIZER
Filed Oct. 9, 1948     3 Sheets-Sheet 1
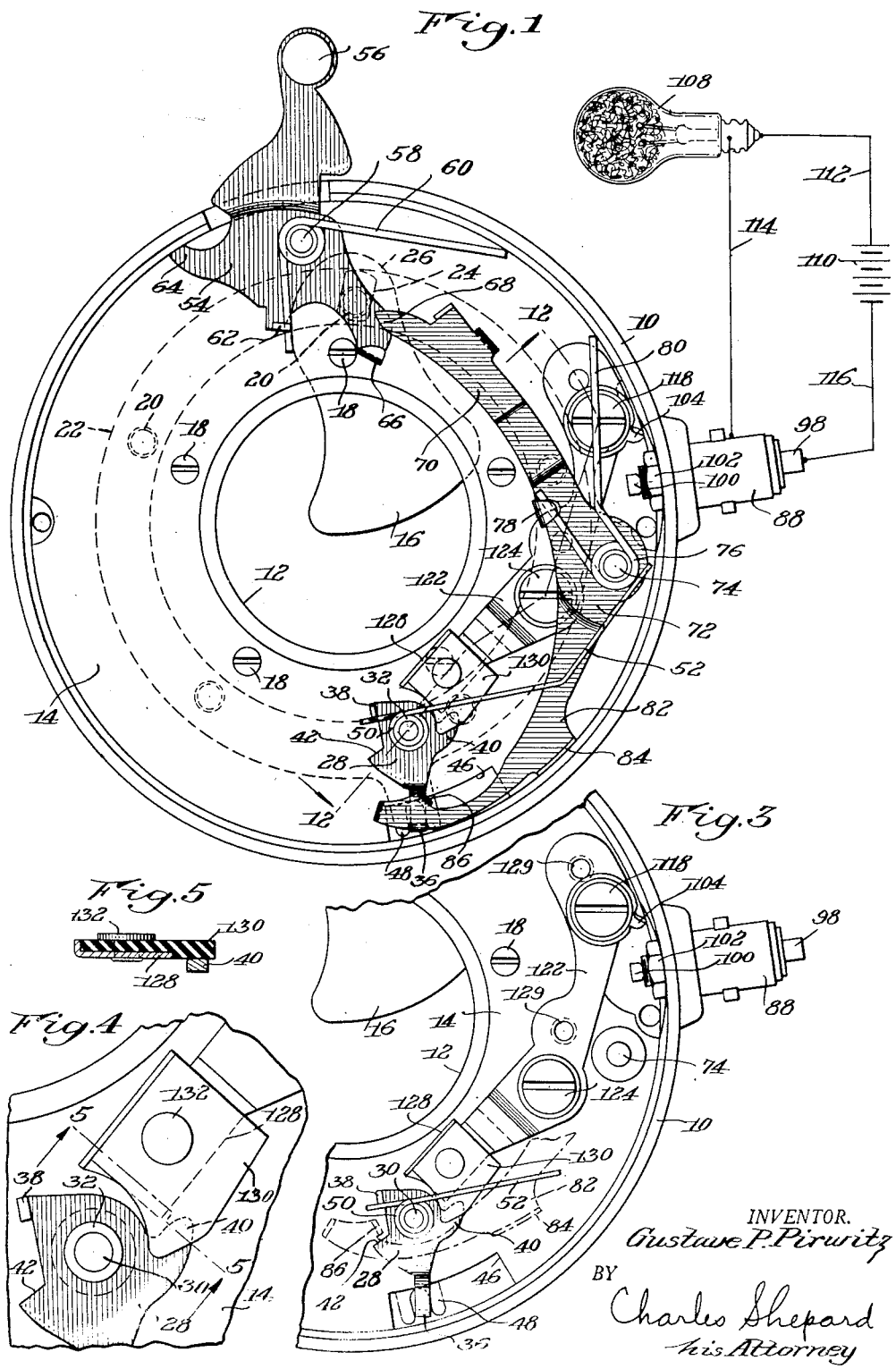
INVENTOR.
Gustave P. Pirwitz
BY Charles Shepard
his Attorney

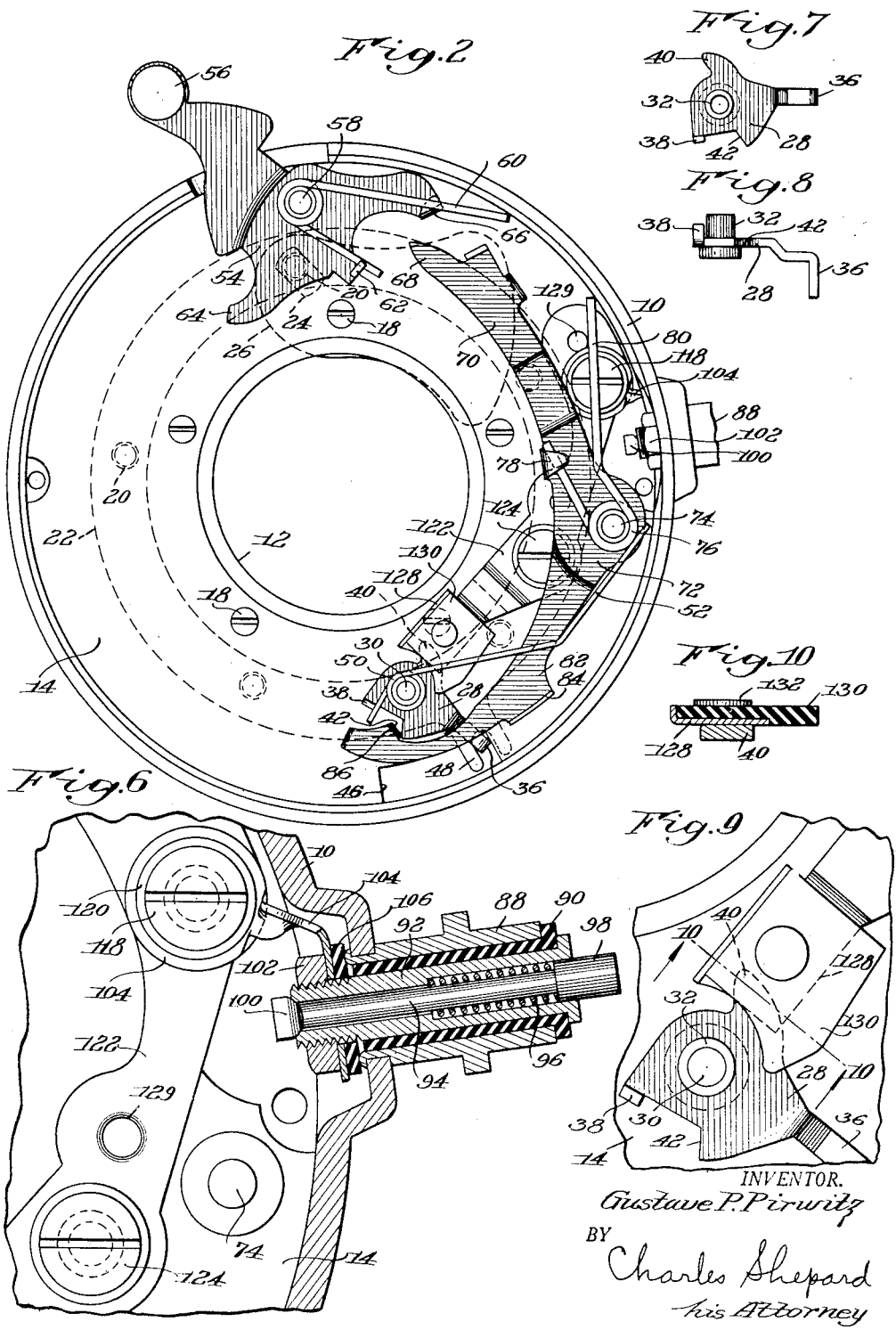

Feb. 3, 1953 G. P. PIRWITZ 2,627,214
PHOTOGRAPHIC SHUTTER WITH SYNCHRONIZER
Filed Oct. 9, 1948 3 Sheets-Sheet 3
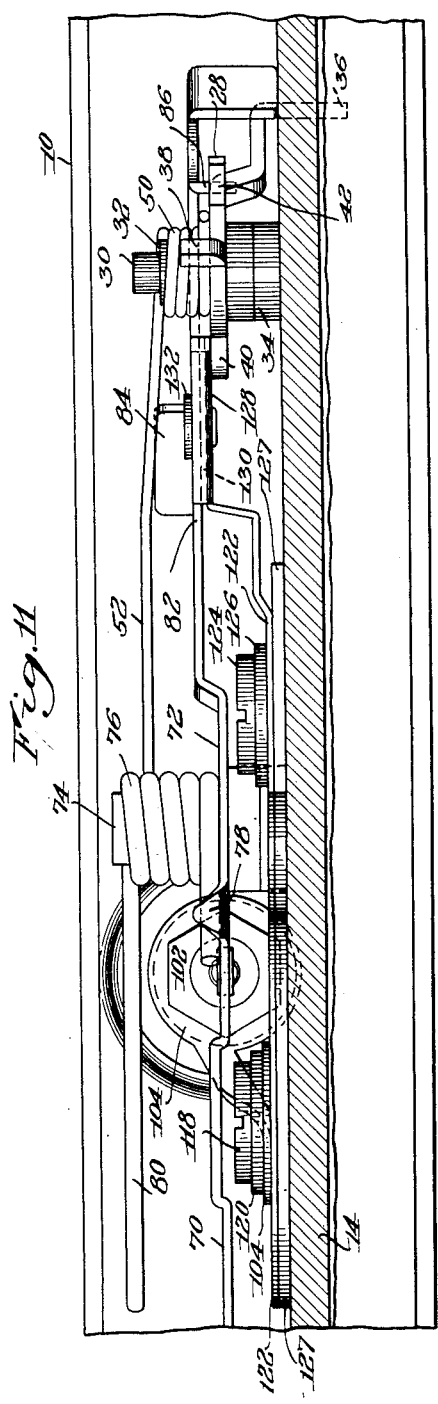
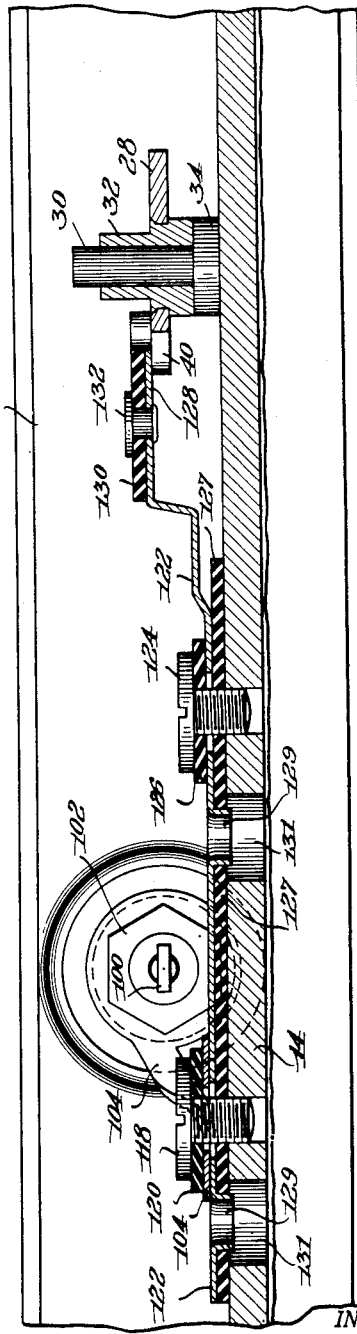
INVENTOR.
Gustave P. Pirwitz
BY
Charles Shepard
his Attorney Patented Feb. 3, 1953

2,627,214

UNITED STATES PATENT OFFICE 2,627,214

PHOTOGRAPHIC SHUTTER WITH SYNCHRONIZER

Gustave P. Pirwitz, Irondequoit, N. Y., assignor to Wollensak Optical Company, Rochester, N. Y., a corporation of New York Application October 9, 1948, Serial No. 53,682

4 Claims. (Cl. 95—11.5)

The present invention relates to photography and more particularly to photographic shutters of the class embodying means built into the structure of the shutter itself for making and breaking, with great precision, an electric circuit which, when energized, performs some function in connection with the exposure of the sensitized material, for instance, the function of igniting a flash bulb or lamp to illuminate the object at the precise moment that the shutter blades have been fully opened or such other time as will pass a maximum of light to the camera lens. The electrical circuit and switch parts are commonly collectively referred to as a synchronizer. The invention has for its general object to provide a simple, accurate, and dependable synchronizer for a relatively inexpensive type of shutter.

Another object of the invention is the provision of synchronizer mechanism so designed as to take advantage of available space within the casing of a camera of known type, and to require for its construction relatively minor changes in or additions to the production tools already in use in the manufacture of the known shutter to which the synchronizer mechanism of the present invention is applied.

These and other desirable objects are accomplished by the construction disclosed as an illustrative embodiment of the invention in the following description and in the accompanying drawings forming a part hereof, in which:

Fig. 1 is a front view, with cover plate and certain other parts removed, of the casing and contained mechanism of a photographic shutter with diagrammatically shown connections to the circuit of a photographic flash bulb, the working parts of the shutter being in normal positions and the shutter aperture being closed though only one of the well known multiple blades is outlined, and the electric circuit being open;

Fig. 2 is a similar view (the circuit connection being broken away) during exposure operation with the blades fully open and the electric circuit closed;

Fig. 3 is a fragmentary reproduction of a portion of the showing of Fig. 1 but with the overlying actuating lever removed to reveal underlying elements more clearly;

Fig. 4 is a fragmentary, enlarged detail of the showing of Fig. 3 with further parts removed for the sake of clarity;

Fig. 5 is a detail section on the line 5—5 of Fig. 4;

Fig. 6 is an enlarged fragment of the showing of Figs. 1 and 3 with the shutter casing wall and the terminal stem for the attachment of circuit connections shown in section;

Fig. 7 is a detail front view of the blade lever or leaf lever alone;

Fig. 8 is an edge view thereof;

Fig. 9 is an enlarged detail similar to Fig. 4 but with the blade ring lever in blade opening and circuit closing position as in Fig. 2;

Fig. 10 is a detail section on the line 10—10 of Fig. 9;

Fig. 11 is a further enlarged fragmentary section through the base plate of the shutter assembly showing principally the actuating lever and the blade ring lever in side elevation; and Fig. 12 is a section through the same group of parts taken substantially on the line 12—12 of Fig. 1.

The same reference numerals throughout the several views indicate the same parts.

Referring more particularly to the drawings, 10 indicates a conventional form of generally circular shutter casing (the front cover plate thereof being removed as aforesaid) in which the hereinafter described mechanism is assembled in an annular group of parts about a central lens opening 12. The blade mechanism for opening and closing this lens opening 12 is housed within a shallow chamber comprised between the rear or bottom wall of the casing and a base plate 14 suitably supported adjacent thereto. The arrangement and movement of the blades of a pivoted blade symmetrical opening shutter of the present type is well known to those skilled in the art and hence only one of the five blades is shown at 16, partly outlined in dotted lines to avoid obstructing the showing of other mechanism. These blades have their fixed pivots at 18 and their movable pivots at 20, the latter consisting of studs on an oscillating ring 22 sometimes called a blade ring or revolving ring. Both the studs and pivots are shown in dotted lines. The studs 20 engage in slots 24 in the tail pieces 26 of the blades so, obviously, as the ring is oscillated back and forth in opposite directions in a suitable corresponding bearing in the blade plate (not shown) the blades will cover and uncover the lens opening 12.

The remainder of the mechanism for motivating the blades is located on the other or front side of the base plate 14 and such mechanism includes a blade lever or leaf lever 28 pivoted on a stud 30 on the base plate. It is shown in detail in Figs. 7, 8, and 12 to comprise a bearing hub 32 resting upon a table 34 at the base of the stud; a downwardly (rearwardly) projecting finger 36; an upwardly (forwardly) projecting ear 38; a laterally projecting contact arm 40, and a shoulder 42. The finger 36 reaches through an elongated segmental opening 46 in the base plate 14 and engages within a fork 48 on an integral extension of the blade ring or revolving ring 22 whereby the blades are closed when the fork and ring are turned clockwise to the left end of the opening as in Figs. 1 and 3, and are fully opened with a reverse movement as in Fig. 2. The first mentioned position is effected and normally maintained by a spring 50 coiled upon the hub 32 of the blade lever 28 to engage ear 38 thereon at one end while its other end 52 reacts against a suitable stationary part. The blades are opened in the normal operation of the shutter in the following manner:

An operating lever 54 having a finger portion 56 projecting to the exterior of the casing is pivoted on a stud 58 rising from the base plate 14 and normally held in the position of Fig. 1 by a spring 60 coiled about its hub with one end engaging an ear 62 on the lever and the other reacting against the casing wall. A stop arm 64 engaging the casing wall defines this position. When the lever is swung against the force of the spring 60, a hooked shoulder 66 on another arm of the lever engages the tip 68 of one arm 70 of an actuating lever or master lever 72 pivoted at about its middle on a stud 74 on the base plate and motivated toward the normal position of Fig. 1 by a master spring 76 coiled about its center and acting at one end against an ear 78 on the lever and reacting at the other end 80 against the casing wall. When the operating lever 54 is tripped, this hooked shoulder 66 engages the tip 68, retracts the actuating lever against the force of its master spring 76, slips off of the tip thereof, and both levers are returned by their respective springs, all in the usual manner.

The other arm 82 of the actuating lever or master lever 72, normally held stopped against the casing wall at 84, is provided near its tip with a downwardly (rearwardly) projecting shoulder 86 (see also Fig. 11) in the swinging path of which is the shoulder 42 on the previously described blade lever 28. The under side of this shoulder 86 is inclined or cam shaped so that as the laterally flexible actuating arm of the master lever reaches the body of the blade lever it will ride over it and the shoulder 86 will snap in behind the shoulder 42 thereof. As this is substantially the limit of movement of the master lever 72 in that direction, the operating lever 54 immediately releases the master lever at that position (shown in dotted lines in Fig. 3), the master spring 76 returns it with its shoulder 86 in engagement with the shoulder 42, and hence the blade lever finger 36 moves the blade ring counterclockwise and opens the shutter blades. After the blades reach fully open position, the shoulder 86 slips off of the end of the shoulder 42, which it is shown about to do in Fig. 2, whereupon the blade lever spring 50 closes the blades again and all parts are restored to normal positions.

Suitable gear trains or other time-delay mechanisms of known form are usually incorporated in the shutter casing in the space to the left of the lens opening (when viewed from the front as in Fig. 1) for controlling the length of time that the shutter blades remain open before the shoulder 86 slips off of the shoulder 42 to start the closing of the blades. Such parts are not here shown because they are well known in themselves and they do not directly affect the present invention.

The parts thus far described constitute (except for some change in the shape of the blade lever 28) approximately the construction of a known camera shutter now on the market. The present invention aims to provide a photoflash synchronizer for such a shutter, in a sturdy, reliable, and economical form, and with minimum changes in or additions to the production tools already in use in the manufacture of such known shutter.

Referring now to the synchronizer parts, the electric circuit is best shown, up to the point that it enters the shutter casing, in Figs. 1 and 6. Riveted to the side wall of the casing in the region of the actuating lever pivot is a tubular stem 88 of a conformation adapting it to receive the attachment of a suitable two wire female circuit plug (not shown). Fitting within stem 88 is an insulating sleeve 90 which isolates a contained conducting tube 92. The latter is counterbored to accommodate a conducting plunger 94 surrounded by an expansion coil spring 96 that tends to thrust the plunger outwardly to make a resilient center contact with the said attaching plug at 98. The other side of the circuit is established by a contact of the plug casing with the stem 88 constituting a secondary ground with the whole metallic casing 10 of the electrically conducting parts of the shutter mechanism in circuit therewith. The inner end of plunger 94 is upset to furnish a head 100 projecting within the shutter casing and resting in a seat at the inner end of conducting tube 92. A nut 102 tightened down on the inner threaded end of the tube 92 holds these parts assembled.

Under nut 102 and in electrical contact therewith is, first, a conductor strip 104, and beneath that an insulating washer 106 to isolate the former from the casing ground. The exterior contact 98, tube 94, nut 102 and strip 104 may be termed the live or hot side of the circuit, and the stem 88 and casing 10 together with the general shutter mechanism, the ground side. Thus, the plug connection previously referred to establishes, during the operation of the shutter and through further instrumentalities about to be described, a circuit through a flash bulb 108 (Fig. 1) for illuminating the scene or object being photographed and used herein as an example of the useful application of the invention. Such circuit passes from the battery 110 and a wire 112 through the flash bulb and thence through a wire 114 to grounded stem 88. The other battery terminal is connected by a wire 116 to the live contact 98.

Referring now principally to Figs. 3, 6, 11, and 12, conducting strip 104 as it leaves its securing nut 102 is given a quarter twist and is secured again beneath the head of a binding screw 118 on the back plate 14, from which head and screw it is insulated by spacing and by a washer 120 beneath the head. Its under side makes electrical contact with a conducting plate 122 secured to the back plate 14 by the binding screw 118 and another like screw 124, similarly insulated from the conducting plate by an insulating washer 126. An insulating plate 127 is interposed beneath the plate 122, further isolating it from the back plate 14 itself. The two plates 122 and 127 are centered on each other by means of punched collars 128 on the plate 122 engaged in openings in the insulating plate and spaced from contact with the back plate 14 by the provision of holes 131 in the latter.

The conducting plate 122 extends in the general direction toward the blade lever 28 and its terminal portion 128, which is also resilient, is bent outwardly to rise above the blade lever and is there fitted flush to the under side of an insulating block 130, Figs. 9 and 10, to which it is riveted at 132. The contact arm 40 on the blade lever 28 is so coordinated that it is in position to brush across the under surfaces of both of these elements 128 and 130, the spring tension of the member 128 holding them tight against the blade lever. Normally, with the shutter blades closed, the arm 40 is in contact only with the insulation block 130, as in Figs. 1 and 3 to 5, but when the blade lever is oscillated by the actuating lever or master lever to open the shutter blades as earlier described, the contact arm 40 passes on and makes contact with the conducting plate 128 at an appropriate time with relation to the time that the lens opening 12 is fully uncovered, Figs. 2, 9, and 10. The circuit to the flash bulb 108 is thus closed by the contact between the member 40, on the grounded side of the circuit, with the member 128, on the hot or live side of the circuit, so that the flash bulb is illuminated. With the ensuing closing of the shutter blades and return of the operating and actuating parts to normal positions, the circuit is broken again as the contact arm 40 resumes its position against the insulating block 130 under the influence of the blade lever spring 59 that closes the blades.

By appropriately varying the shape of the contact arm 40, or by slightly bending the contact member 128 inwardly toward the center of the shutter or outwardly away from the center, the exact timing or synchronization of the circuit closing with relation to the shutter blade opening may be varied or adjusted. As is well known, different kinds of photoflash bulbs have different time lags or time intervals required for the bulb to reach maximum intensity of illumination after the electric circuit to the bulb is closed. Two of the most popular kinds of photoflash bulbs are Class F, having a time lag of about 5 milliseconds, and Class M, having a time lag of about 20 milliseconds. The circuit parts in the present construction are preferably so formed and adjusted that the closing of the circuit occurs about 1.5 milliseconds before pinpoint opening of the shutter blades. With this arrangement, the shutter may be used effectively with Class F lamps at all shutter speed settings from 1/200 second (the fastest speed for which this shutter is designed) to the slowest, including T and B. Also it may be used effectively with Class M lamps at shutter speed settings of 1/50 second or slower. In this construction, the time interval between the closing of the electric circuit and the pinpoint opening of the shutter blades is constant at all speed settings of the shutter, including B and T.

A circuit closing shutter made in accordance with this invention is sturdily constructed of simply formed parts so few in number that they add little in complexity over the necessary operating parts for a shutter of its kind, and the added parts are convenient for assembly, access, and adjustment, while the brushing or wiping contact made by the blade lever contact arm in closing the circuit keeps these parts always clean and bright. Furthermore, while the circuit must be carried from the stem 88 to the rather remote blade lever, this is done without interference through the operating zone of actuating lever 72 because of the close arrangement against the back plate.

It is seen from the foregoing disclosure that the above-mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. In an electric circuit closing photographic shutter, the combination with a casing provided with two externally accessible terminals adapted to be included in such a circuit, a separate mounting plate in the casing, and a blade mechanism including shutter blades movable between closed and open positions and an annular blade ring pivotally connected to the blades to open them upon rotary movement of said ring in one direction and to close them upon rotary movement of said ring in the opposite direction, of a pivoted blade lever spaced from said externally accessible terminals and mounted for oscillation about a pivotal axis on the mounting plate, such oscillation being in a plane parallel with the mounting plate, said blade lever being operatively engaged with said blade ring to rotate the blade ring first in one direction and then in the other direction when the blade lever oscillates first in one direction and then in the other, for opening and closing the blades, said blade lever being provided with a laterally disposed contact arm also parallel with the mounting plate arranged to oscillate in a definite arc in a plane perpendicular to said axis during such oscillation of the blade lever, an insulating plate lying flat against said mounting plate and located at least partially between said blade lever and said terminals, a conducting plate electrically connected to one of the terminals and overlying the insulating plate throughout a substantial part of the length thereof, said conducting plate and said insulating plate being secured to the mounting plate at two spaced points by insulated fastener means, one end of said conducting plate extending beyond said points in cantilever fashion and being offset outwardly from the plane of said insulating plate and being formed as a contact surface lying substantially parallel to said mounting plate and in position to be engaged by said contact arm on the blade lever during part of the oscillating movement thereof, and an insulating block carried and supported by the cantilever end of said conducting plate, said block having a surface flush with and forming a continuation of said contact surface engaged by said contact arm and being of sufficient size so that said contact arm of said blade lever, during all parts of its travel, is engaged with either said contact surface of said conducting plate or the surface of said insulating block, the other terminal being grounded to the shutter casing and mechanism.

2. A construction as described in claim 1, further including a pair of spaced openings in said insulating plate, a pair of locating bosses on said conducting plate extending snugly into said openings to locate said conducting plate accurately on said insulating plate, and a pair of larger openings in said mounting plate in line with said bosses so as to avoid contact between said bosses and said mounting plate.

3. A photoflash synchronizer for a photographic shutter of the type including a shutter casing having an upstanding annular outer wall, a separate mechanism mounting plate within said casing, a blade lever mounted on the mounting plate for oscillation about a pivotal axis approximately perpendicular to said mounting plate, a blade operating ring mounted for rotation and engaging said blade lever to be turned first in one direction and then in the opposite direction by oscillation of said blade lever to open and close the shutter blades, and a master member pivotally mounted on said mounting plate for oscillation approximately in a plane parallel to said mounting plate to operate said blade lever to open and close said shutter blades, said synchronizer including an external electric connection member insulated from and projecting through said annular outer wall, an insulating strip of approximately plane form carried by and lying substantially flat on said mounting plate, a metallic conducting strip on the mounting plate passing between said master member and said mounting plate and lying substantially flat on said insulating strip throughout a major part of the length of said conducting strip, a pair of screws passing through said metallic conducting strip and said insulating strip and threaded into said mounting plate to hold said conducting strip and insulating strip in fixed relation to each other and to said mounting plate, said screws being insulated from said conducting strip, an electrical connection between said external connection member and said metallic strip adjacent one end thereof, said metallic strip adjacent its other end being of cantilever formation offset substantially from the plane of said insulating strip but lying parallel with the mounting plate and having a sliding contact surface lying substantially parallel to the plane of oscillation of said blade lever and substantially perpendicular to said pivotal axis of said blade lever in position to be engaged by and to make electrical contact with a portion of said blade lever during part of the oscillatory movement of the latter, and an insulating block mounted on and supported by said offset cantilever end of said metallic strip and out of contact with said insulating strip and mounting plate, said insulating block having a recess for receiving said strip, said recess being of substantially the same depth as the thickness of said strip so that the surface of said block along the side of said metallic strip is substantially flush with and substantially a smooth continuation of said sliding contact surface of said metallic strip, said metallic strip and insulating block being so positioned that in all operative positions of said blade lever said portion of said blade lever is engaged either with said sliding contact surface of said metallic strip or with the adjacent flush surface of said insulating block.

4. A construction as described in claim 3, in which said insulating strip has a plurality of holes therein and in which said metallic strip has a plurality of protruding portions engaged snugly in said holes to locate said metallic strip in predetermined position on said insulating strip, and in which said mounting plate is cut away at points opposite the protruding portions of said metallic strip to avoid accidental contact therewith.

GUSTAVE P. PIRWITZ.

REFERENCES CITED

The following references are of record in the file of this patent:

UNITED STATES PATENTS

| Number | Name | Date |
|---|---|---|
| 2,145,917 | Boesser | Feb. 7, 1939 |
| 2,358,941 | Schwartz | Sept. 26, 1944 |
| 2,405,741 | Fuerst | Aug. 13, 1946 |
| 2,439,417 | Castedello | Apr. 13, 1948 |
| 2,469,688 | Fuerst | May 10, 1949 |
| 2,490,163 | Schwarz | Dec. 6, 1949 |